United States Patent [19]

Moynihan

[11] 4,379,116

[45] Apr. 5, 1983

[54] PROCESS FOR THE PREPARATION OF POLYVINYLBUTYRAL SHEETING AND ADHESION CONTROL

[75] Inventor: Robert E. Moynihan, Lowell, Ohio

[73] Assignee: E. I. Du Pont de Nemours and Company, Wilmington, Del.

[21] Appl. No.: 324,117

[22] Filed: Nov. 23, 1981

[51] Int. Cl.³ ............................................. B29B 1/04
[52] U.S. Cl. .................................. 264/349; 264/211; 524/400
[58] Field of Search ............... 264/211, 349; 523/332; 524/400

[56] References Cited

U.S. PATENT DOCUMENTS

| | | | |
|---|---|---|---|
| 3,153,009 | 10/1964 | Rombach | 260/73 |
| 3,231,461 | 1/1966 | Mattimoe | 161/199 |
| 3,249,487 | 5/1966 | Buckley et al. | 161/199 |
| 3,262,837 | 7/1966 | Lavin et al. | 161/199 |
| 3,519,584 | 7/1970 | Juredine | 524/400 |
| 3,718,516 | 2/1973 | Buckley et al. | 156/106 |
| 3,838,091 | 9/1974 | Kanno et al. | 260/31.2 |
| 4,180,620 | 12/1979 | Inskip | 428/524 |
| 4,292,372 | 9/1981 | Moynihan | 524/400 |

*Primary Examiner*—Donald E. Czaja
*Assistant Examiner*—W. J. Thompson

[57] ABSTRACT

Magnesium or calcium carboxylate used as an adhesion control agent for plasticized polyvinylbutyral sheeting by incorporating into the sheeting after water removal and prior to extrusion.

6 Claims, No Drawings

PROCESS FOR THE PREPARATION OF POLYVINYLBUTYRAL SHEETING AND ADHESION CONTROL

BACKGROUND OF THE INVENTION

Polyvinylbutyral is widely used in combination with one or more layers of glass to provide a composite which is resistant to shattering. The polyvinylbutyral typically contains a plasticizer to provide a balance of mechanical properties satisfactory for subsequent handling and performance requirements.

Particularly in automotive applications, the polyvinylbutyral also contains an adhesion control additive to provide a balance between maintaining the integrity of a windshield on impact and cushioning impact through energy absorption. Many adhesion control additives have been used successfully in the past, but often exhibit a moisture sensitivity that can result in a clouding of the polyvinylbutyral sheeting in high humidity environments, particularly at the edges of glass laminates containing the sheeting.

SUMMARY OF THE INVENTION

The instant invention provides a process for the preparation of polyvinylbutyral sheeting which results, in glass laminates containing the sheeting, in exceptionally low edge cloud in high humidity environments.

Specifically, the instant invention provides, in a process for the preparation of polyvinylbutyral sheeting comprising admixing an aqueous slurry of polyvinylbutyral and a compatible quantity of plasticizer, removing at least part of the water from the aqueous slurry and extruding the resulting admixture in the form of a sheet, the improvement which comprises adding to the admixture, after water removal and prior to extrusion, about from 10 to 1,000 ppm of at least one metal carboxylate of the formula $M(CO_2R)_2$ wherein M is magnesium or calcium and R is $CH_3$ or hydrogen.

DETAILED DESCRIPTION OF THE INVENTION

The polyvinylbutyral used in the instant invention is that produced by the reaction of polyvinyl alcohol and butyraldehyde, and having a residual hydroxyl content of about from 17 to 24 percent. The invention relates to that procedure for the preparation of polyvinylbutyral, plasticization and subsequent formation into a sheet known as the "wet process". In that process, as described, for example, in Rombach U.S. Pat. No. 3,153,009, polyvinyl alcohol and butyraldehyde are reacted in an aqueous solution and the resulting polyvinylbutyral is plasticized in an aqueous slurry. The polyvinylbutyral slurry should comprise at least about 70% water, and typically is made up of one part of polyvinylbutyral to about eight parts of water. The plasticizer is added to this aqueous slurry. This process may be contrasted with the procedure of first preparing the polyvinylbutyral, drying it prior to plasticizing, and mixing it with the plasticizer in a dry condition.

The particular plasticizer used in the instant invention is not critical, and can be selected from those generally used for polyvinylbutyral. Particularly preferred plasticizers include triethylene glycol di-2-ethylbutyrate (3GH) and tetraethylene glycol di-n-heptanoate (4G7). The amount of plasticizer that can be used will vary, as known to those skilled in the art, according to the hydroxyl content of the polyvinylbutyral, the particular plasticizer used, and the desired degree of plasticization. However, in general, the plasticizer will comprise about from 20 to 50 parts by weight of the polyvinylbutyral.

After formation of the polyvinylbutyral and plasticization in an aqueous slurry, the slurry is pressed to remove most of the water. After pressing, as the plasticized PVB enters the extruder for formation into sheet, the water content is less than about 20 weight percent.

The metal carboxylates of the present invention have the general formula $M(CO_2R)_2$ wherein M is magnesium or calcium and R is hydrogen or methyl. The desired formate or acetate is most conveniently added to the plasticized PVB in the extruder used to form a sheet. The metal formate or acetate can be added as an aqueous solution, and should be introduced in quantities to provide about from 10 to 1,000 ppm of the metal carboxylate, based on the final weight of the plasticized sheeting, and preferably about from 30 to 400 ppm. In the present invention, the quantity of metal carboxylate is measured as metal ion.

After addition of the metal carboxylate, the plasticized PVB is extruded into sheeting, dried and heat treated according to conventional procedures.

The sheeting resulting from the present process can be laminated with one or more layers of glazing material according to conventional procedures to provide a laminar structure suitable for automotive or architectural glazing. The resulting laminates, when exposed to high humidity environments, result in unusually low edge cloud formation. This resistance to edge cloud formation is obtained with the relatively simple magnesium and calcium carboxylates of the present invention and, for reasons not fully understood, appears to be unique to the aqueous plasticization of polyvinylbutyral as opposed to the admixture of dry polyvinylbutyral with plasticizer.

The present invention is further illustrated by the following specific examples, in which parts and percentages are by weight unless otherwise indicated. In these Examples, the following tests and procedures were used.

Pummel Adhesion: SAE J1208

Penetration Resistance: ANSI Z36.1 using a staircase method to determine mean break height instead of the one level test of Z26.1 as described in U.S. Pat. No. 3,718,516.

Edge Stability: ANSI Z26.1 with samples tested for four weeks instead to two.

Compressive Shear Adhesion: The adhesion of the samples of glass was measured by the following procedure. For each test, five one inch square specimens are cut from PVB/glass laminate with a water-cooled glass cutoff saw with a diamond or carborundum blade. The area of each specimen is measured to the nearest 0.001 inch. Each specimen is held at a 45° angle to a supporting table in a compression testing machine and a compressive force is applied to the sample at the rate of 0.1 inch per minute. The force required to break the bond between the glass and the interlayer is recorded and the compressive shear strength is calculated according to the formula:

$$\text{Compressive Shear Adhesion (psi)} = \frac{\text{Force (pounds) required to break bond}}{\text{Area of sample to 0.001 square inch}}$$

The average for the five specimens is reported for the sample.

In general, good impact performance is attained at a compressive shear test result of 800 to 2600 psi.

EXAMPLE 1

38 parts of tetraethylene glycol di-n-heptanoate was added to a slurry of 100 parts of polyvinylbutyral, having a vinyl alcohol content of 23 percent, in about 800 parts of water at 40° C. The mixture was agitated until the plasticizer was absorbed. This mixture, along with 40 percent recycled plasticized polyvinyl butyral from a previous extrusion, was fed to an extractive extruder. Aqueous magnesium formate solution was added to give 25 ppm magnesium in the 0.030-inch thick product sheeting. The sheeting was dried to a water content of 0.54 percent and heat treated according to normal procedures. The sheeting was formed into a laminate with two layers of glass. The laminates were tested and gave a Compressive Shear Adhesion of 2496 psi. Edge cloud was rated at zero after four weeks in the Edge Stability test. 12-inch by 12-inch laminates gave a mean penetration height of 19.3 feet in the five-pound ball impact test.

edge cloud of 17/64″ when subjected to the Edge Stability test.

EXAMPLES 3-4 AND COMPARATIVE EXAMPLES B-C

The aqueous plasticization and extraction extrusion procedure was repeated with triethylene glycol di-2-ethyl butyrate and the metal carboxylates listed in Table I. In Comparative Examples B-C, the dry flake plasticization-extrusion procedure of Comparative Example A was repeated with the same metal salts and plasticizers as shown in Table I. In each case, the procedure of this invention gave product with markedly superior performance in the Edge Stability test. In addition, the plasticization procedure using dried polyvinyl butyral gave product with higher haze.

COMPARATIVE EXAMPLES D-H

The aqueous plasticization and dry flake plasticization procedures of Examples 1 and A were carried out with the potassium carboxylates and plasticizers listed in Table II. The aqueous plasticization procedure did not give superior edge cloud performance versus the dry plasticization procedure.

TABLE I

| METAL CARBOXYLATE | PLAST. TYPE | AQUEOUS PLASTICIZATION | | | | DRY PLASTICIZATION | | | |
|---|---|---|---|---|---|---|---|---|---|
| | | Example | Metal Ion ppm | Edge Cloud 64th | Haze % | Example | Metal Ion ppm | Edge Cloud 64th | Haze % |
| Calcium Acetate | 3GH | 3 | 40 | 0 | 0.2 | B | 36 | 13 | 0.4 |
| Calcium Formate | 3GH | 4 | 28 | * | 0.3 | C | 28 | 10 | 1.1 |

*very light

TABLE II

| METAL CARBOXYLATE | PLAST. TYPE | AQUEOUS PLASTICIZATION | | | | DRY PLASTICIZATION | | | |
|---|---|---|---|---|---|---|---|---|---|
| | | Example | Metal Ion ppm | Edge Cloud 64th | Haze % | Example | Metal Ion ppm | Edge Cloud 64th | Haze % |
| Potassium Formate | 3GH | D | 338 | 20 | 0.1 | | | | |
| Potassium Formate | 4G7 | E | 367 | 12 | 0.3 | G | 360 | 12 | 0.4 |
| Potassium (1:2) Formate/Acetate | 4G7 | F | 518 | 11 | — | H | 456 | 11 | 0.3 |

EXAMPLE 2

The procedure of Example 1 was repeated except that the sheeting contained 32 ppm magnesium. Windshields were fabricated from this product at a water content of 0.65 percent. 12-inch by 12-inch laminates cut from these windshields had a mean penetration height of 22.3 feet in the five-pound ball impact test. Compressive Shear Adhesion was 1490 psi. Sections of the windshield containing an original edge were rated at zero edge cloud at two weeks and four weeks in the Edge Stability test.

COMPARATIVE EXAMPLE A

A polyvinylbutyral slurry, prepared in the same manner as that in Example 1, was filtered and dried. Nominal 0.030-inch sheeting was produced by mixing in an extractive extruder 100 parts of the granular polyvinylbutyral, 38 parts of tetraethylene glycol di-n-heptanoate and sufficient water solution of magnesium formate to give 41 ppm magnesium in the sheeting product. Glass laminates at 0.5 percent water content in the interlayer gave a Compressive Shear Adhesion of 3064 psi and an

I claim:

1. In a process for the preparation of polyvinylbutyral sheeting comprising admixing an aqueous slurry of polyvinylbutyral and a compatible quantity of plasticizer, removing at least part of the water from the aqueous slurry and extruding the resulting admixture in the form of a sheet, the improvement which comprises adding to the admixture, after water removal and prior to extrusion, about from 10 to 1,000 ppm of at least one metal carboxylate of the formula $M(CO_2R)_2$ wherein M is magnesium or calcium and R is $CH_3$ or hydrogen.

2. A process of claim 1 wherein the metal carboxylate consists essentially of magnesium formate.

3. A process of claim 1 wherein the metal carboxylate consists essentially of calcium acetate.

4. A process of claim 1 wherein the metal carboxylate consists essentially of calcium formate.

5. A process of claim 1 wherein about from 30 to 400 ppm of the metal formate are added to the admixture of plasticizer and aqueous slurry.

6. A product of the process of claim 1.

* * * * *